UNITED STATES PATENT OFFICE.

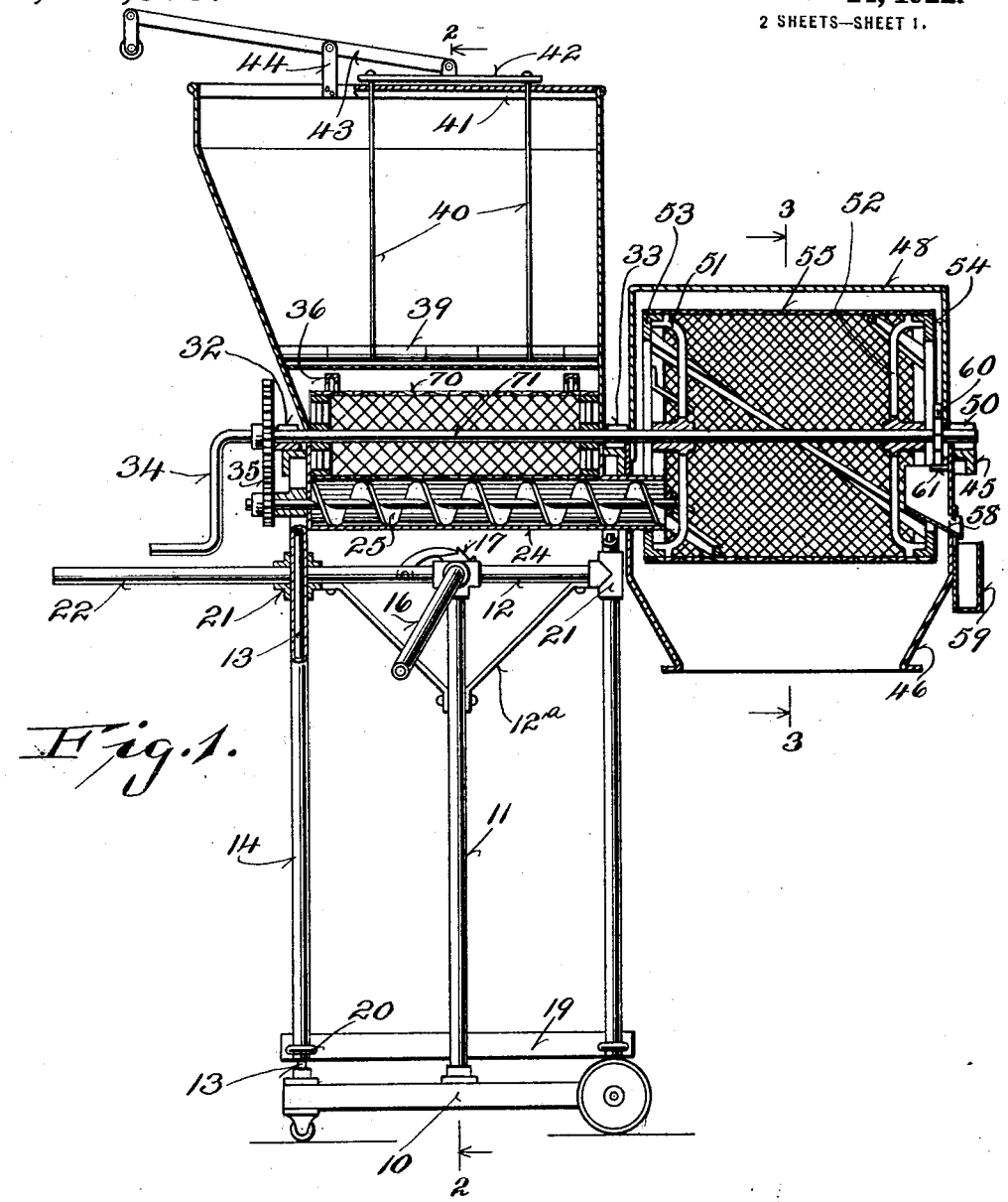

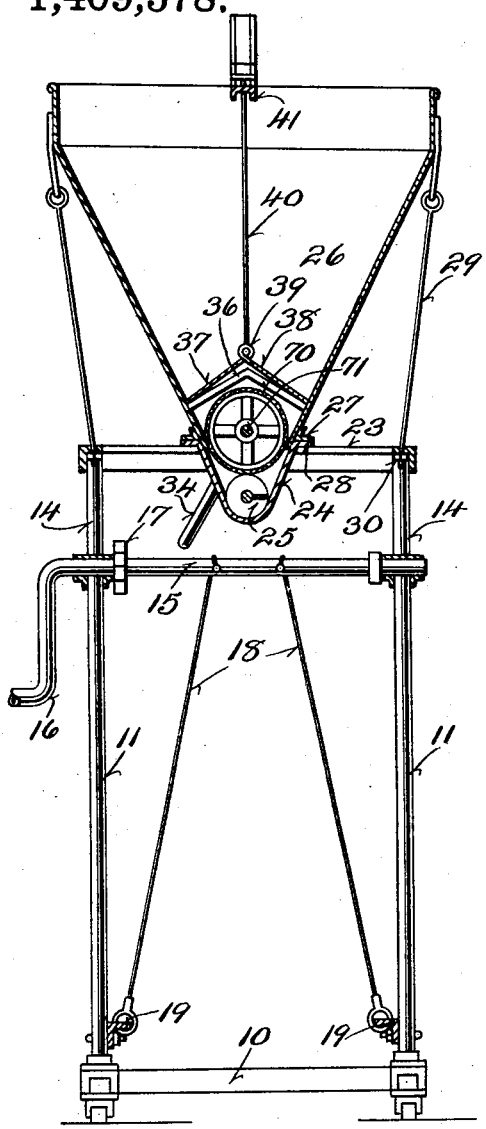
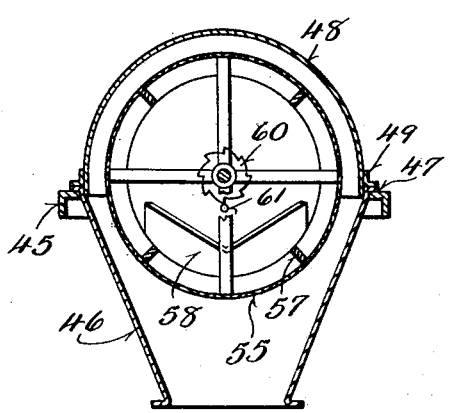
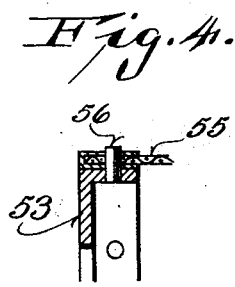

JULIUS RIEMENSCHNEIDER, OF MILWAUKEE, WISCONSIN.

SIFTER.

1,409,578. Specification of Letters Patent. Patented Mar. 14, 1922.

Application filed January 13, 1921. Serial No. 436,896.

*To all whom it may concern:*

Be it known that I, JULIUS RIEMEN-SCHNEIDER, a citizen of the United States, and resident of Milwaukee, in the county of Milwaukee and State of Wisconsin, have invented certain new and useful Improvements in Sifters; and I do hereby declare that the following is a full, clear, and exact description thereof.

This invention relates to improvements in sifters, and is more especially adapted for use in bakeries or other establishments wherein it is necessary to sift large quantities of flour, meal and the like.

One of the principal objects of the invention is to provide a device of this character which may be easily moved from one place to another, and which may be readily adjusted for use in connection with a dough mixer, or the like.

Another important object of the invention is to provide means whereby the lumps may first be broken up and the material subsequently conveyed to a sieve of finer mesh which separates all the impurities and foreign matter from the same.

A further object of the invention is to provide means for adjusting the feed so that greater or less amounts of material may be fed to the sifter, or the feed may be cut off altogether while the sieve is being operated.

Other objects and advantages will be apparent as the description proceeds, and it is, of course, to be understood that my invention is not limited to the precise structure herein shown and described, but comprises all modifications which may fall within the scope of the appended claims.

In the accompanying drawings forming a part of the specification, Figure 1 is a longitudinal sectional view through the sifter mechanism with the supporting means shown in elevation.

Figure 2 is a vertical transverse section on the line 2—2 of Figure 1.

Figure 3 is a vertical transverse section on the line 3—3 of Figure 1, and

Figure 4 is a sectional detail showing the manner in which the sieve is mounted on the spiders supporting the same.

The device of which my invention forms a part, comprises a truck 10, on which are mounted the vertical standards 11 which, at their upper ends, carry the cross heads 12. These crossheads are provided with suitable braces 12$^a$. From the corners of the truck rise rods 13 on which telescope the hollow shafts 14 which carry the sifting mechanism. Extending transversely between the cross heads 12, is a rotatably mounted windlass 15 which is actuated by the crank 16 and held in adjusted position by the pawl and ratchet 17. Around the windlass 15 are wound the flexible members 18, which at their lower ends, are connected to the angle bars 19, which are rigidly connected to the hollow shafts 14 by suitable means, such as the U-bolts 20.

As the windlass is wound up the hollow shafts 14 are raised vertically through the sleeves 21, which are carried on the ends of the cross heads 12, and the sifting mechanism is thus raised as desired.

Handles 22 project from one side of the supporting frame for convenience in moving the truck from place to place. The vertical hollow shafts 14 carry at their upper ends the bed 23, in which is mounted the trough 24, in which is rotatably mounted a screw conveyor 25. Above the trough is a hopper 26, the downwardly converging sides of which are received within the upper edges of the trough. Angle irons 27 serve to support the hopper in fixed relation to the trough, said angle irons 27 resting on the rims 28.

The upper edge of the hopper is held in stable position by means of the tie rods 29, which are adjustably connected to the bed 23 by the nuts 30. A rotary cylindrical sieve 70 is mounted within the lower part of the hopper, and is carried on the shaft 71 which is rotatably mounted in the bars 32 and 33 supported from the bed 23.

The shaft 71 is provided with a hand crank 34, for rotating the same and is connected by the spur gearing 35 to the rotary screw conveyor 25.

Above the rotary sieve 70 at each end are located the V-shaped shoulders 36, on which ride the hinged cut-off members 37 and 38, which are hinged together at 39. Rods 40 extend from the hinged member 39 to the mouth of the hopper, where they extend through the channel irons 41 extending across the mouth of the hopper. The upper ends of the rods 40 are connected by the cross head 42, which is pivotally connected to the lever 43, which is fulcrumed at 44 on the channel bar.

Thus it will be seen that by moving the lever 43, the cross head 42 may be raised and lowered, thus causing the edges of the members 37 and 38 to slide on the shoulders 36 and cut off or regulate the amount of material fed to the sieve 70.

The bed 23 is extended at the delivery side of the structure to form the auxiliary bed 45 from which is supported the outlet chute 46 which is adapted to be connected with a dough mixer or bag, or other receptacle for receiving sifted flour. The chute 46 is provided at its upper end with the flange 47 for retaining the same in position. On the bed supported above the chute is the cylindrical housing 48, which is provided with the angle irons 49 which rest on the flange 47. The shaft 71 is extended through the housing 48, and its outer end is journaled at 50 in the auxiliary bed 45.

Carried by the outer end of the shaft are spiders 51 and 52, which support the annular bearing rings 53 and 54, on which is mounted the cylindrical sieve 55. Since it may be desirable to remove the screen 55 to substitute another of different mesh, the same is made removable by providing the annular rings 53 and 54 with pins 56 as shown in Figure 4 which engage in holes provided in the screen.

Connected with the annular rods 53 and 54 are the spiral ribs 57 which help to support the screen 55, and also as the screen rotates they direct the material therein toward the other end of the screen. The waste matter which fails to pass through the screen as the screen is rotated slides towards the lower ends of the ribs, and as the ribs are carried up over the axis this matter drops into the spout 58, which is mounted within the screen and delivers it to the receptacle 59 supported at the outer end of the same.

The end of the shaft 71 is also provided with the cam wheel 60 which, as the shaft and screens rotate, engages with the pin 61 and agitate the screen 55 and the material within it.

In the operation of the device, the flour or other material to be sifted is placed in the hopper 26. By raising the hinge 39, the cut-off members 37 and 38 are drawn away from the sides of the hopper, allowing the material to pass downwardly against the sieve 70. The rotation of the sieve will cause the lumps to be crushed between the same and the sides of the hopper, and material thus broken up will pass into and through the sieve to the conveyor 25, which conveys it to the interior of the sieve 55 where it is sifted after the manner hereinbefore described.

The material which is suitable to be used for baking then drops through the sieve 55 and through the outlet 46 into the dough mixer or other receptacle which is provided for that purpose. The coarse material and foreign matter which are separated from the flour are then delivered by the ribs 53 and spout 58 into the receptacle 59.

Thus it will be seen that I have provided a sifter which may be conveniently used in bakeries and the like where it is desirable to sift large quantities in the quickest and most convenient manner.

It will also be seen that by removing the nuts 30 the hopper may be lifted off. The shaft 71 and the sieves carried thereby may then be readily removed from the bearings 32, 33 and 50 for cleaning or for repairs.

I claim as my invention:

1. In a device of the character described, a frame, a cylindrical sieve rotatably mounted therein, a hopper located above the sieve for discharging material onto the outer surface thereof, means for adjustably controlling the rate of discharge of material from the hopper to the sieve, a second cylindrical sieve mounted to rotate simultaneously with the first sieve, and a conveyor for receiving material that has passed through the first sieve and delivering it to the interior of the second sieve.

2. In a device of the character described, a frame, a shaft rotatably mounted therein, two cylindrical sieves carried by said shaft to rotate therewith, a rotary screw conveyor geared to said shaft and located to receive material that passes through the first sieve and deliver it to the interior of the second sieve at one end, means for delivering at the other end of the second sieve material which fails to pass through the same, and means for collecting the material which passes through the sieve.

3. In a device of the character described, a hopper, a rotary cylindrical sieve mounted in the bottom thereof, a pair of cut-off members hinged together, and normally extending across the hopper above the sieve, suitable guides on which the members are slidably supported and means for raising the hinge to draw the cut-off members away from the sides of the hopper to permit material in the hopper to pass into the sieve.

In testimony that I claim the foregoing I have hereunto set my hand at Milwaukee, in the county of Milwaukee and State of Wisconsin.

JULIUS RIEMENSCHNEIDER.